(12) United States Patent
Roop et al.

(10) Patent No.: US 7,654,203 B2
(45) Date of Patent: Feb. 2, 2010

(54) FREIGHT TRANSPORTATION SYSTEM AND METHOD

(75) Inventors: Stephen S. Roop, College Station, TX (US); Craig E. Roco, College Station, TX (US); Leslie E. Olson, Arlington, TX (US); Curtis A. Morgan, College Station, TX (US)

(73) Assignee: The Texas A&M University System, College Station, TX (US)

( * ) Notice: Subject to any disclaimer, the term of this patent is extended or adjusted under 35 U.S.C. 154(b) by 911 days.

(21) Appl. No.: 10/875,021

(22) Filed: Jun. 22, 2004

(65) Prior Publication Data

US 2005/0279241 A1 Dec. 22, 2005

(51) Int. Cl.
*B60L 13/00* (2006.01)

(52) U.S. Cl. ..................................... 104/290
(58) Field of Classification Search ................ 105/355, 105/359, 404, 396; 104/281, 287, 288, 290, 104/292
See application file for complete search history.

(56) References Cited

U.S. PATENT DOCUMENTS

| | | | | |
|---|---|---|---|---|
| 3,934,183 | A * | 1/1976 | Saufferer | 318/135 |
| 4,092,554 | A * | 5/1978 | Quinn | 104/292 |
| 6,293,473 | B1 * | 9/2001 | Ortwein et al. | 238/2 |
| 6,584,912 | B2 * | 7/2003 | Forbes | 105/419 |

FOREIGN PATENT DOCUMENTS

| DE | 27 29 874 | 1/1977 |
|---|---|---|
| WO | WO 96/14685 | 5/1996 |

OTHER PUBLICATIONS

McGraw-Hill Science and Technology Dictionary and Encyclopedia 2003.*
Notification of Transmittal of the International Search Report and the Written Opinion of the International Searching Authority of International application No. PCT/US05/18247, filed May 24, 2005, (7 pages), Aug. 3, 2005.
Railways, The Hamlyn Publishing Group Limited, New York, 1972, p. 151, 1972.
Notification of Transmittal of partial Supplementary European Search Report, Reference No. JL37467P.EPP, 5 pages, May 5, 2007.
The First Office Action (PCT Application in the National Phase), the Patent Office of the State Intellectual Property Office of the People's Republic of China, 10 pages, Mar. 20, 2009.

* cited by examiner

*Primary Examiner*—S. Joseph Morano
*Assistant Examiner*—Robert J McCarry, Jr.
(74) *Attorney, Agent, or Firm*—Baker Botts L.L.P.

(57) ABSTRACT

According to one embodiment of the invention, a freight transportation system includes a track comprising a pair of rails and a linear motor reaction plate disposed between the rails and a transport vehicle having a universal intermodal container bay configured to accommodate a plurality of containers. The transport vehicle includes one or more suspension systems each having a plurality of steel wheels engaged with the rails. The freight transportation system further includes a linear induction propulsion system coupled to the transport vehicle and operable to work in conjunction with the linear motor reaction plate to move the transport vehicle, and a control system coupled to the linear induction propulsion system and operable to control the movement of the transport vehicle.

25 Claims, 6 Drawing Sheets

FREIGHT TRANSPORTATION SYSTEM AND METHOD

GOVERNMENT RIGHTS

This invention may have been made with Government support from the Transportation Equity Act for the 21st Century (TEA-21). The government may have certain rights in this invention.

TECHNICAL FIELD OF THE INVENTION

The present invention relates generally to the transportation industry and, more particularly, to a freight transportation system and method.

BACKGROUND OF THE INVENTION

Intermodal container transport is currently a cross-modal undertaking, handled by ship, railroad, truck, and to a lesser extent, by barge on inland waterway systems. Each mode has advantages and disadvantages in the handling of containers.

Railroads excel in the movement of material over long distances. The economic radius of intermodal freight via railroads is considered to fall outside a 500 mile range. They are characterized by low cost over these extreme distances and have the added benefit of low environmental impact from emissions when compared to trucking. The disadvantages of railroads include the lack of speed in transporting commodities and a distinct lack of flexibility when compared to trucking. For example, there is no door-to-door service. Railroads have lost market share to trucks and are completely dominated in the intercity, short haul market.

Trucks dominate freight transportation, particularly in the intercity corridors served by many interstate highway systems. Trucks have historically offered a fast, flexible means of moving goods from one location to another. Increasingly, however, trucks are creating significant disadvantages in the form of highway safety issues, pavement damage, highway congestion, and diminished air quality.

SUMMARY OF THE INVENTION

According to one embodiment of the invention, a freight transportation system includes a track comprising a pair of rails and a linear motor reaction plate disposed between the rails and a transport vehicle having a universal intermodal container bay configured to accommodate a plurality of containers. The transport vehicle includes one or more suspension systems each having a plurality of steel wheels engaged with the rails. The freight transportation system further includes a linear induction propulsion system coupled to the transport vehicle and operable to work in conjunction with the linear motor reaction plate to move the transport vehicle, and a control system coupled to the linear induction propulsion system and operable to control the movement of the transport vehicle.

Embodiments of the invention provide a number of technical advantages. Embodiments of the invention may include all, some, or none of these advantages. A freight transportation system, according to one embodiment of the invention, is a hybrid concept drawing some of its design components from existing systems that is intended to offer a low-cost, reliable alternative to the intracity and/or intercity movement of freight by more conventional means such as trucks. The freight transportation system may be designed to operate over dedicated, grade separated right-of-way, thus reducing the burden on highways in terms of safety, wear, and capacity.

A freight transportation system according to one embodiment of the invention provides improvements over freight transport by railroad by allowing individual containers to be sent as they are received in a "just-in-time" shipping system and interacting efficiently with existing modes. A freight transportation system may be designed to minimize or eliminate most of the technology traps railroads find themselves working to overcome. For example, a linear induction propulsion system means there are virtually no moving parts related to motive power and propulsion. The primary elements subject to failure are wheel bearings, which, with this system, may be easily monitored via heat or acoustic sensors.

In addition, the freight transportation system may be automated and unmanned, and may be grade separated and free of impediments posed by crossing other infrastructure at grade. It may also be designed to operate with an electrically powered linear induction motor. This power source may provide the system considerable flexibility in terms of basic fuel used to generate power. These fuel options may include coal, natural gas, oil, nuclear, hydrogen, or solar.

A freight transportation system according to one embodiment of the invention provides improvements over freight transport by trucks by yielding positive rates of return under conservative capital cost scenarios and varying levels of use. The system may, in fact, operate on a twenty-four hour per day, seven day a week basis and be largely immune from delays caused by inclement weather, traffic congestion, or disruptive roadway occurrences. This feature may provide improved service and high capacity levels, which may allow a system design with direct links to terminals, improving throughput and flow. In addition, the freight transportation system may allow for the introduction of "urban dray" vehicles that are designed with short-haul and medium-haul capabilities, and air-quality friendly propulsion systems using alternative fuels such as propane or natural gas, reducing the use of heavy diesel tractors in urban areas and positively impacting air quality.

Other technical advantages are readily apparent to one skilled in the art from the following figures, descriptions and claims. Moreover, while specific advantages have been enumerated above, various embodiments may include all, some or none of the enumerated advantages.

DETAILED DESCRIPTION OF THE INVENTION

Figure 1:
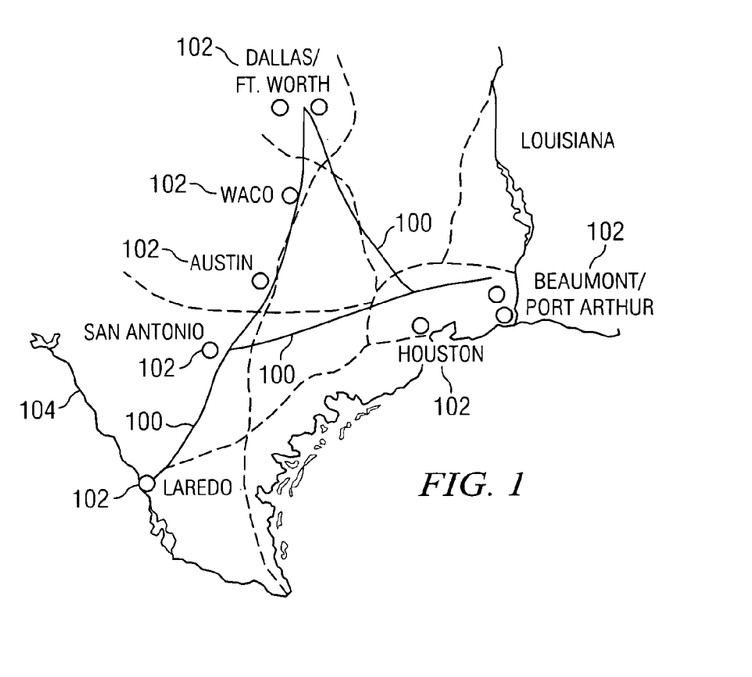
FIG. 1 is a geographical schematic illustrating routes of a freight transportation system according to one embodiment of the invention.

FIG. 1 is a geographical schematic illustrating various routes 100 of a freight transportation system according to one embodiment of the invention. In the illustrated embodiment, routes 100 are shown to extend between various cities 102 of a state 104; however, routes 100 may extend between any suitable locations.

As described in greater detail below, some embodiments of the present invention are directed towards a freight transportation system that offers a low-cost, reliable alternative to the intercity movement of freight than more conventional systems such as trucks. The present invention is particularly suitable for the transportation of freight within a 500 mile range because of the advantages over transportation by trucks, which typically dominate intercity freight transportation. However, the freight transportation system as described herein is also suitable for distances greater than 500 miles in which it would directly compete with freight transportation by railroad. Some advantages of the freight transportation system described herein over freight transportation by railroad is that individual containers may be sent as they are received in a "just-in-time" shipping system and better reliability due to the type of propulsion systems utilized. In some embodiments, routes 100 may be individually associated with multi-use corridors, such as a corridor 200 as illustrated below in conjunction with FIGS. 2A and 2B.

Figure 2A:
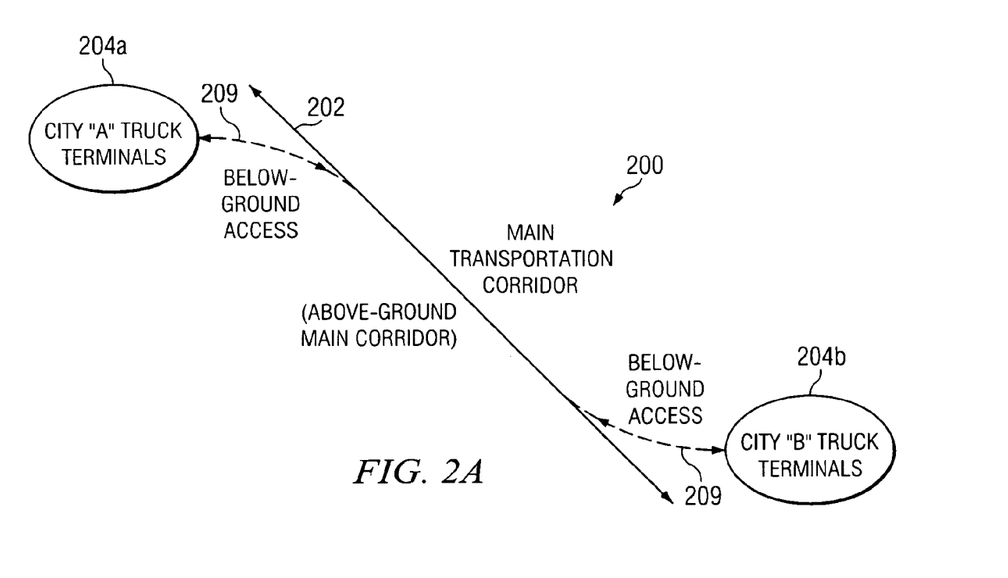
FIGS. 2A and 2B are schematics illustrating a corridor having an associated route between two truck terminals of a freight transportation system according to one embodiment of the invention.
Figure 2B:
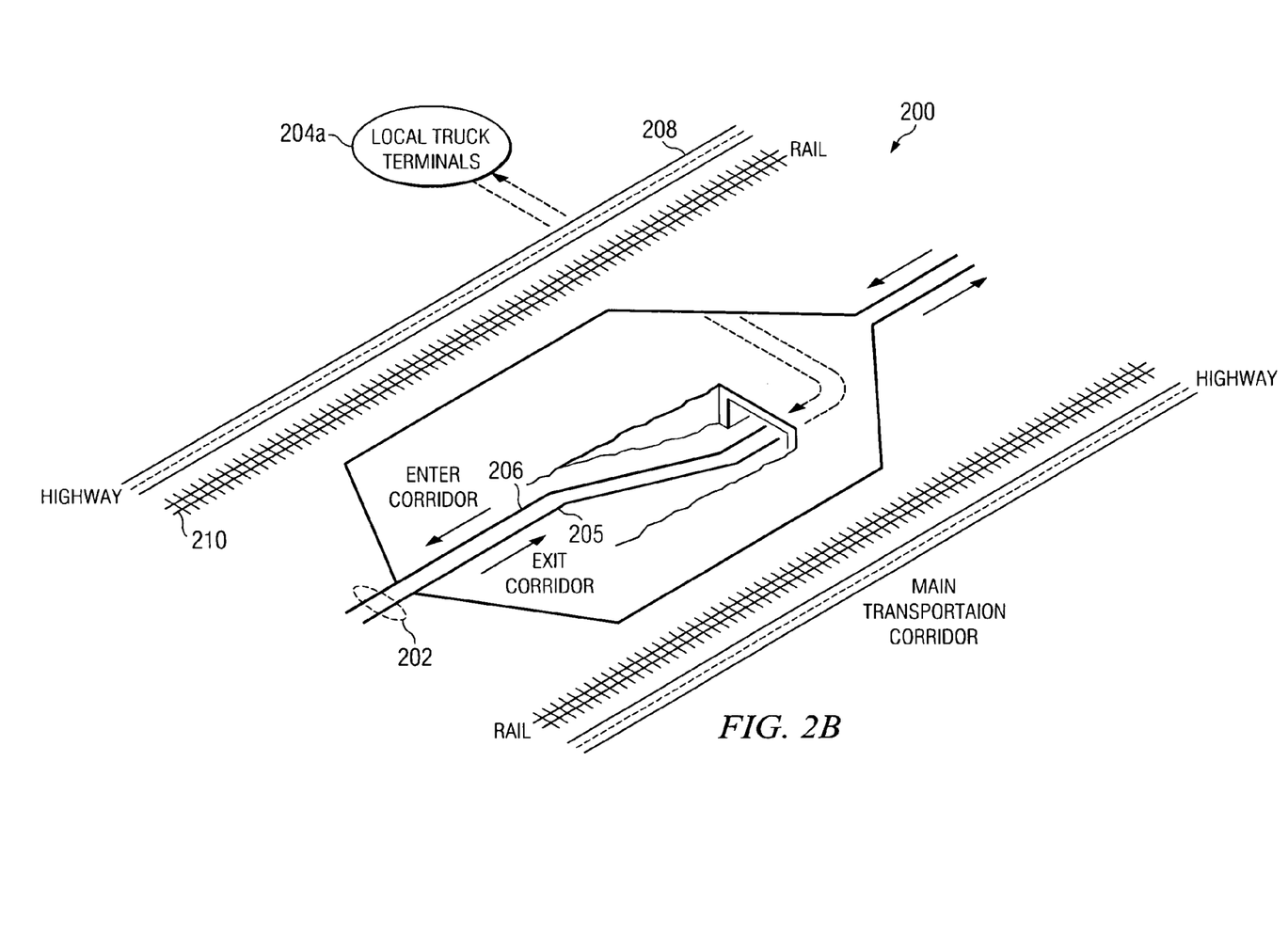

FIGS. 2A and 2B are schematics illustrating corridor 200 having an associated route 202 extending between a truck terminal 204a and a truck terminal 204b according to one embodiment of the invention. Although corridor 200 is illustrated in FIG. 2B as being at grade, the present invention contemplates corridor 200 being grade separated (i.e., below grade or above grade). Access to truck terminals 204a, 204b, as indicated by dash lines 208 in FIG. 2A, may also be at grade or grade separated. For example, referring to FIG. 2B, the access to truck terminal 204a is illustrated as being below grade.

Referring to FIG. 2B, corridor 200 may include route 202 along with one or more highways 208, one or more passenger or freight rails 210, and other suitable systems, such as pipelines, fiber optics, or other suitable systems that are adapted for long distances.

Route 202 includes an exit corridor 205 and an enter corridor 206 that connect to truck terminal 204a so that a transport vehicle 400 may transport cargo 302 to and from truck terminal 204a, as illustrated in greater detail below in conjunction with FIG. 3.

Figure 3:
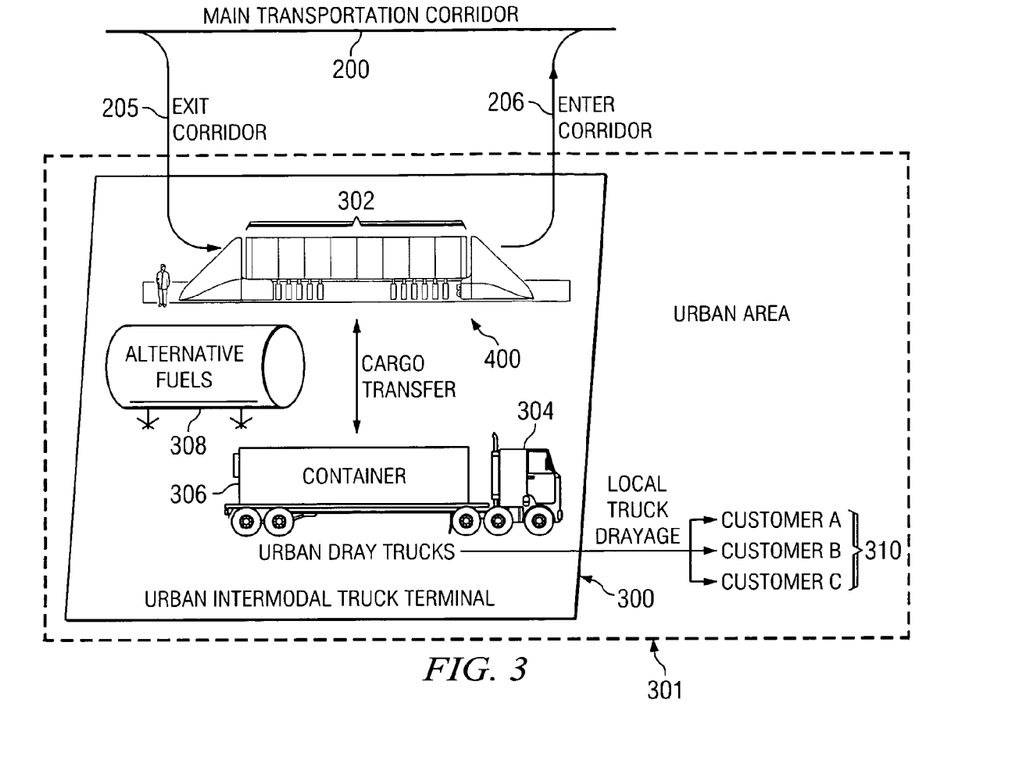
FIG. 3 is a schematic illustrating a truck terminal according to one embodiment of the invention.

Referring to FIG. 3, transport vehicle 400 is illustrated as idle within a truck terminal 300 according to one embodiment of the invention. Transport vehicle 400 arrives at truck terminal 300 via exit corridor 205 departs truck terminal 300 via enter corridor 206 after loading and/or unloading cargo 302. Transport vehicle 400, which is an important component of the freight transportation system of the present invention, is illustrated in greater detail below in conjunction with FIGS. 4A and 4B.

Truck terminal 300 is illustrated in FIG. 3 as being located in an urban area 301; however, truck terminal 300 may be located in any suitable location. In addition, as described above, truck terminal 300 may be at grade or grade separated. Truck terminal 300 includes a truck 304 configured to haul cargo 302 to and from customers 310. Although FIG. 1 illustrates truck 304 as being a dray truck, other suitable vehicles are also contemplated by the present invention.

An urban dray vehicle is advantageous as an alternative fuel vehicle that lowers mobile emissions and favorably impacts the air quality of urban areas. In addition, it is estimated that local delivery of containers, such as a container 306 illustrated in FIG. 3, would require a substantially lower horsepower engines than over-the-road trucks normally employ. The production could result in engines rated at 160-180 horsepower as contrasted to diesel engines commonly operating in the 240 horsepower range. With alternative fuels, such as natural gas, urban dray vehicles could reduce emissions by as much as 50 percent over enhanced diesel truck emissions.

In the illustrated embodiment, truck 304 is shown as hauling an intermodal container 306 loaded from transport vehicle 400; however, as described in greater detail below, truck 304 may transport any suitable cargo that is stored in any suitable manner, such as manufacturer's packaging such as boxes, aggregated packaging such as pallets, containers, and trailers. Truck terminal 300 also includes alternative fuel source 308 for truck 304 or other suitable vehicle.

Although not illustrated in FIG. 3, any suitable lifting mechanism, such as an overhead crane, portable crane, or intermodal crane may be used to transfer cargo 302 between transport vehicle 400 and truck 304. These lifting mechanisms, as well as other systems and/or components associated with truck terminal 300 may or may not be automated. The present invention contemplates truck terminal 300 having more, less, or different components than those illustrated in FIG. 3.

Figure 4A:
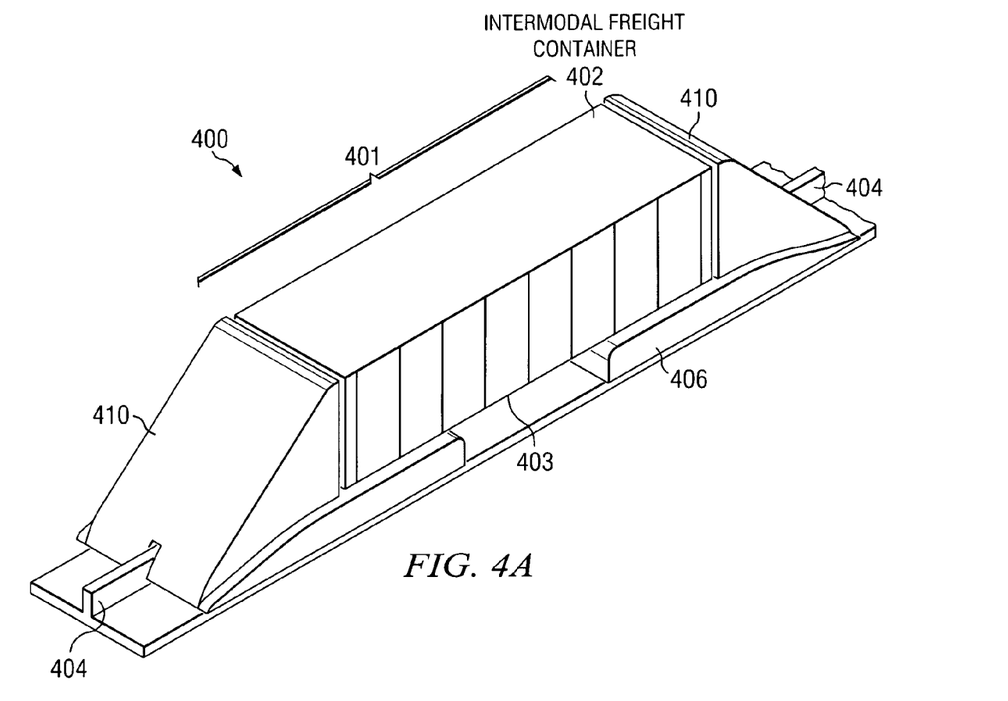
FIGS. 4A and 4B are perspective and elevation views, respectively, of a transport vehicle according to one embodiment of the invention.
Figure 4B:
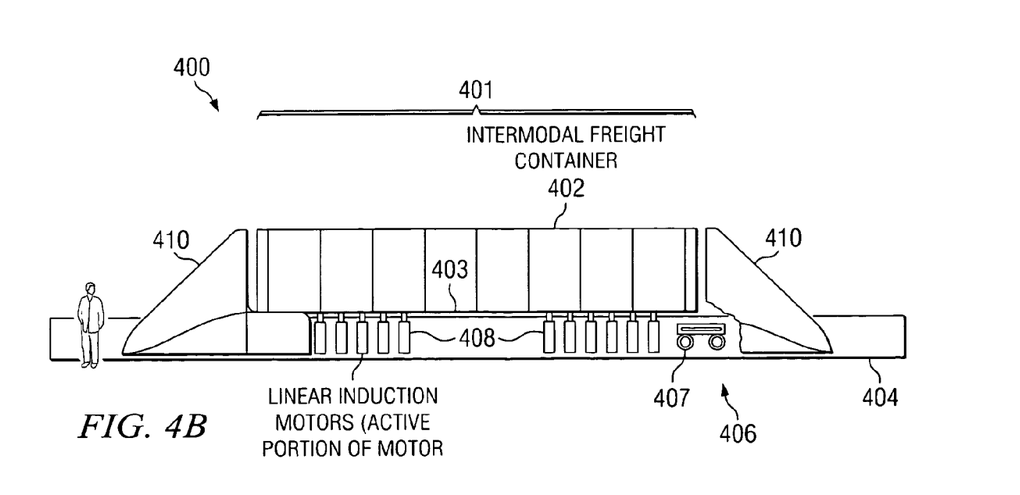

FIGS. 4A and 4B are perspective and elevation views, respectively, of transport vehicle 400 according to one embodiment of the invention. Although only one transport vehicle 400 is illustrated in FIGS. 4A and 4B, the present invention contemplates any suitable number of transport vehicles 400 coupled to one another in any suitable manner. Each transport vehicle 400 is driven by a propulsion system 408 and rides along on a track 404 via one or more suspension systems 406. Transport vehicle 400 transports cargo 401 via one or more intermodal freight containers 402 associated with a universal intermodal container bay 403. Transport vehicle 400 may also include a pair of aerodynamically shaped coverings 410 at each of its ends. One advantage of the present invention is that transport vehicle 400 may be automated and controlled or otherwise managed by a control system or systems. Such a control system is described in greater detail below in conjunction with FIG. 7.

Intermodal freight containers 402 may be any suitable structural components configured to hold cargo 401 during transport. In one embodiment, intermodal containers 402 resemble the intermodal containers used in international trade. In one embodiment, these are approximately 40 feet long by 9½ foot square; however, intermodal containers 402 may have any suitable size and shape. For example, in some embodiments of the invention, a length of intermodal container 402 ranges from approximately 40 feet to 54 feet. One advantage of using intermodal containers is that the freight transportation system would become a link in the already established intermodal system that includes steamship lines, rail, trucking, and even barges whereby intermodal containers are transferred between modes quickly. In other embodiments, intermodal containers 402 are highway trailers so that they may be easily transferred to a suitable truck after arriving at its destination.

One advantage of the present invention is that different types of freight containers that handle different types of cargo may be utilized with transport vehicle 400 depending on the mode of transportation contemplated at the truck terminals at the particular destination. Intermodal containers 402 may be supported in any suitable manner. For example, a central beam coupled to suspension systems 406 may be utilized that is similar to the central beams utilized in the railroad industry. The support may also resemble a box shaped support in which the intermodal containers 402 sit down into and are latched onto for securing purposes via any suitable method.

In one embodiment, the structural frame of transport vehicle 400 requires a capability to withstand all static and dynamic forces throughout its life. Based on anticipated design loads for this embodiment, a steel structure may be required and would weigh approximately twice the amount required for span support in order to minimize deflections, vibrations, and fatigue. The design loads of this structure, which is anticipated to be approximately 30 feet in length, are as follows. A distributed live load of 500 lb/ft, a frame weight of 1,000 lb, and propulsion and control system weight of 2,000 lb. Using these loading conditions, the frame of a fully loaded transport vehicle may be required to resist a maximum bending moment of 60 k-ft. However, the design moment should be approximately 120 k-ft (twice the maximum bending moment) in order to provide the strength required to limit deflection, vibration, and fatigue.

Suspension systems 406 may be any suitable suspension systems having any number of wheels 407 for riding along track 404. For example, suspension systems 406 may be four-wheel bogie suspension systems or two-wheel, single-axle systems. In one embodiment, suspension systems 406 have steel wheels that engage respective rails 504 (FIG. 5A) and turn independently of each other in order to eliminate any problems associated with radial tracking due to wheel-running surface differential speeds in curves. In one embodiment, wheels 407 have a flat profile (as illustrated best in FIG. 5A) to minimize the frictional component as compared to the rail-flange-running surface found in traditional railroad operations. In this embodiment, steel wheels 407 are not flanged and do not serve to guide transport vehicle 400. This is described in greater detail below in conjunction with the embodiment of FIG. 5A.

Suspension systems 406 may have other suitable systems or components associated therewith, such as an optional pneumatic, hydraulic, or electric braking system, shock absorbing system, or other suitable system. Suspension systems 406 may couple to the main support of transport vehicle 400 in any suitable manner. Other suitable suspension systems are contemplated by the present invention, such as a mag-lev system, a rubber tire system or other suitable systems.

Track 404, may be any suitable track system operable to support transport vehicle 400 and to guide transport vehicle 400 along a particular route. Various designs for track 404 are illustrated below in conjunction with FIGS. 5A and 5B; however, any suitable track system is contemplated by the present invention.

Propulsion system 408 provides the motive power for transport vehicle 400. In the illustrated embodiment, propulsion system 408 includes a plurality of linear induction motors vertically oriented with respect to a linear motor reaction plate 506 (illustrated best in FIG. 5A). However, other suitable propulsion systems are contemplated by the present invention, such as linear induction motors that are horizontally oriented, a more conventional motor design used in, for example, common railroads, a hydrogen-based propulsion system, natural gas-powered electric motors, and rotating electric traction motors. In a particular embodiment of the invention, propulsion system 408 includes two sets of opposing twenty horsepower motors.

Figure 5A:
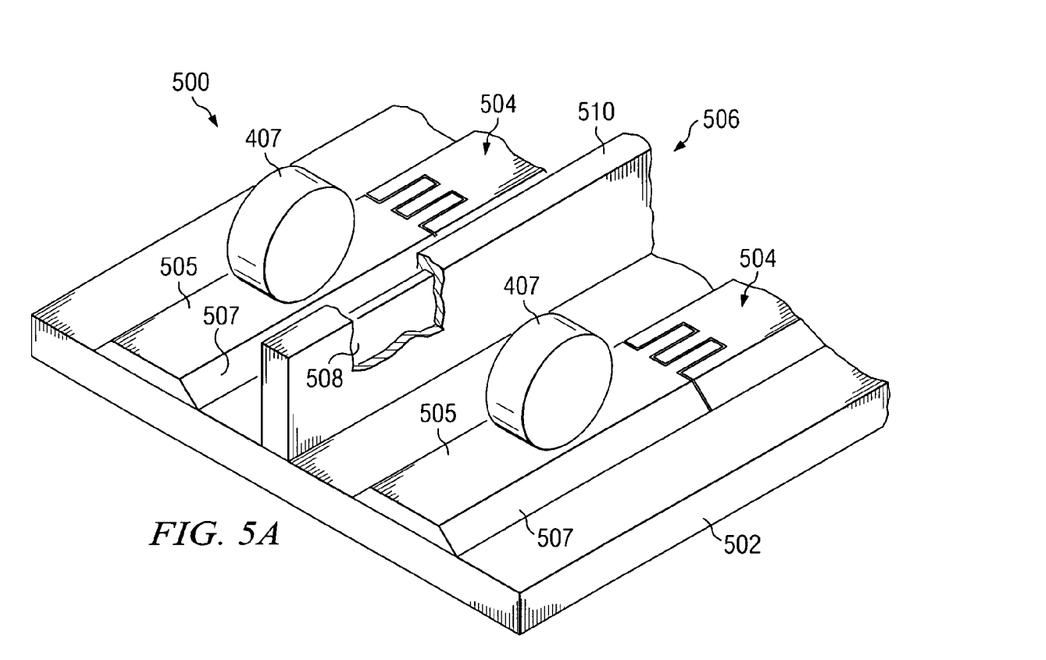
FIGS. 5A and 5B are partial perspective views illustrating various track designs for a freight transportation system according to some embodiments of the invention.

Some advantages of using linear induction motors are that they are environmentally friendly compared to some of the other systems that utilize fuel, there are virtually no moving parts related to the mode of power and propulsion, and the shifting of the generation of power from a motor that fails to the remaining motors. Their use may also facilitate more speed than conventional systems and reduce the occurrence of electrical breakdowns as compared to conventional rotating motors. One thing that is needed for linear induction motors is electricity, and this may be delivered to the linear induction motors in any suitable manner, such as using a third rail, which is well known in the art of transportation. In order to prevent the linear induction motors from touching linear motor reaction plate 506, a distance between each linear induction motor and linear motor reaction plate 506 is incorporated into the design. This distance may be any suitable distance, such as a half inch or more.

In one embodiment of the invention, the power requirement for a single transport vehicle is forty (40) horsepower to accelerate transport vehicle 400 from zero mph to sixty mph in sixty seconds. This assumes a total mass of thirty-six tons (nine tons for transport vehicle mass and 27 tons for maximum container mass). Further assuming a drag friction of 0.77 kwh/ml, a rolling resistance of 0.0036 kwh/ton-mi, a negligent shock loss, and an efficiency loss due to the linear induction motor of 2.0, then the total work required is 1.8 kwh/ml. The initial acceleration requirement is assumed to be 0.7204 kwh/ton-mi. This initial acceleration is multiplied by the mass of thirty-six tons to arrive at 25.9 kwh energy requirement. The equivalent horsepower is approximately thirty-five horsepower. To include for some efficiency loss for magnetic slip on an incline of about 12%, five horsepower is added to the thirty-five to arrive at the forty horsepower power requirement as indicated above. Again, this is just one example of a power requirement for transport vehicle 400; other suitable power requirements are contemplated by the present invention.

One analysis to develop the power/energy requirements for a freight transportation system according to an embodiment in which transport vehicle is associated with an underground (i.e., below grade) freight transportation system conservatively shows that 130 kW of peak electric load capacity would be the maximum required for a truck equivalent of freight in a fully-loaded transport vehicle, 30 pallets totaling 100,000 pounds including a transport vehicle tare weight. Assuming an anticipated load profile of 2,000 trucks per day along a particular corridor, the maximum occupancy occurs between the hours of 9:00 a.m. and 4:00 p.m. The total number of transport vehicles during its peak hour of 4:00 p.m. is 1,891 units.

Assuming the maximum load of the transport vehicle during acceleration to be 37 kW, then the load is approximately twice this value or 74 kW since it is assumed that two transport vehicle loading docks are at each terminal. The additional load for the corridor may be assumed to be up to 50 miles for any electric current block in the system. Assuming the maximum power needs for the corridor to be the maximum occupancy of the peak period coincidence loading for 50 miles of corridor length, then based on four transport vehicles per minute being sent into the corridor from each terminal, there can be a maximum of 400 transport vehicles occupying 50 miles of the corridor simultaneously. The analysis assumes that wherever a positive gradient occurs in one direction an equal but negative gradient occurs in the opposite direction. Further, it is assumed no gradient is continuous, but the predominant physical aspects of the gradient is level with an overall lift from start point to end point being equalized by the fall in the opposite direction.

Energy recovery from electric power regeneration occurs when a transport vehicle uses a power control system to slow the transport vehicle while going down grade is expected to be one-half the efficiency losses due to the use of a linear motor drive. The energy calculations include the efficiency loss for the power consumption. However, assuming the electrical slip loss of the linear motor to be 50 percent less than the rotating traction motor, then the regeneration losses will be 50 percent of the recovery capacity or only 25 percent of the energy input needed to maintain speed up a positive gradient for the transport vehicle using electrical regeneration going down the gradient. Therefore, for every 130 kW required to go up a gradient, only 32 kW is recovered by those going down the gradient. The ultimate balance is a cost of a 100 kW instead of a cost of 130 kW for each of the transport vehicles, one up and one down.

The potential for gradients along a route was considered and it was assumed that there will be no more than 10 percent of the entire length to have substantial gradients. Gradients were also assumed to be principally located in one half of the system and evenly distributed. Therefore, there is approximately 0.2 miles of gradient every mile in that half of the system. For the 50 miles of system being considered to have the maximum occupancy, it is evident that the traffic will be in the area with gradients. A total of 10 miles of grade may be expected to be encountered in any 50 miles in that particular half. Given that the transport vehicle distribution will be four units per mile (maximum departure rate from either terminal) in either direction, there will be 400 transport vehicles in the 50 mile length of concern. Since a net capacity of 100 kW per two transport vehicles occupying a grade (one in each direction) is required, there will be 80 transport vehicles occupying the gradients in the 50 mile length being evaluated and thus 8,000 kW peak load capacity. The remainder of the transport vehicles are all assumed to be in level transit. In level transit, the transport vehicle requires 2 kW to maintain its acquired speed of 60 miles per hour. Thus, the remaining transport vehicles require a load capacity from the electricity supply system of 640 kw.

The peak electric load capacity requirement with the highest occupancy 50 mile length of the freight transportation system is conservatively estimated to be 9,000 kW of capacity and overall this freight transportation system capacity is at most estimated to be 50 MW. Based on current peak load 57,000 MW requirements within ERCOT and the generating capacity, 70,700 MW, the corridor's overall capacity requirement represents less than one-half of one percent of ERCOT's reserve. This preliminary work suggests that 200 kW of electrical power is required to transport each truck equivalent of freight (30 pallets).

Aerodynamically shaped coverings 410 may have any suitable size and shape and function to reduce drag on transport vehicle 400. Aerodynamically shaped coverings 410 may also structural components of the frame of transport vehicle 400. Aerodynamically shaped coverings 410 may also serve to protect cargo 401 and/or to house any suitable components or systems, such as a control system for controlling transport vehicle 400. Such a control system is described in greater detail below in conjunction with FIGS. 7 and 8.

A study was performed to minimize drag on the transport vehicles during transport through a corridor for the purpose of minimizing energy expenditures. This show that aerodynamic drag minimization is primarily associated with a reduction in skin friction and pressure drag. Consequently, computational tools were used to perform an aerodynamic analysis of transport vehicle configurations that would minimize these parameters. This work produced the following recommendations to minimize drag. Use a continuous transport vehicle configuration with the surface of the separate transport vehicles blended. Use a rectangular cross-section transport vehicle with curvature and profile. A suitable low-drag profile is formed from two circular arms joined by a flat section. Blockage ratios ($\beta$) should be kept below 0.3. Clearance between the upper surface of the transport vehicle and the roof of a tunnel (assuming a below grade implementation) should be greater than 3 feet, and clearance between the sidewall and the transport vehicle also should be greater than 3 feet.

Figure 5B:
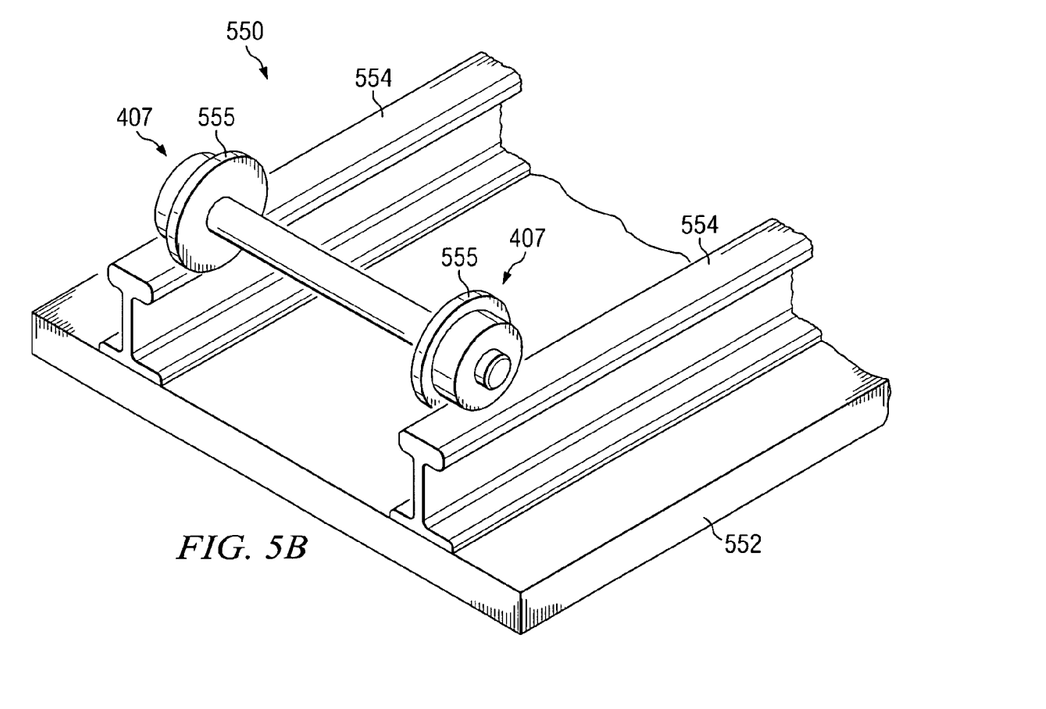

FIGS. 5A and 5B are partial perspective views illustrating two different designs for track 404 according to some embodiments of the present invention. Referring first to FIG. 5A, a track 500 is illustrated having a substrate 502, a pair of rails 504, and linear motor reaction plate 506.

Substrate 502 may be formed from any suitable material, such as reinforced concrete, and may have any suitable thickness. Rails 504 are coupled to, embedded within, or otherwise attached to substrate 502 and are formed from any suitable material, such as steel. Rails 504 functions to support the weight of transport vehicle 400 and provide a running surface for wheels 407. In the illustrated embodiment, rails 504 include flat upper surfaces 505 that, in conjunction with flat wheels 407, promote less rolling friction than conventional rail systems. Rails 504 may also include optional tapered surfaces 507. Additional details of rails 504 are discussed below in conjunction with FIG. 6.

Linear motor reaction plate 506 in conjunction with propulsion system 408 functions to guide transport vehicle 400 during operation. Linear motor reaction plate 506 may be any suitable size and shape and may be formed from any suitable material. In one embodiment, a height of linear motor reaction plate 506 is at least eighteen inches.

In the illustrated embodiment, linear motor reaction plate 506 is formed from inner aluminum plates 508 that are faced with cast iron plates 510. Aluminum plates 508 and cast iron plates 510 may be coupled to one another in any suitable manner. Aluminum plates 508 and cast iron plates 510 may each be made of a plurality of separate plates that are held together by mechanical means, such as bolts or other suitable fasteners. In a particular embodiment of the invention, aluminum plates 508 are placed together in a staggered manner and held together by mechanical means and cast iron plates 510 are attached to the outer faces of aluminum plates 508 by suitable mechanical means, thus forming a continuous "sandwich" of aluminum core with cast iron facing. A suitable spacing exists between the adjacent aluminum plates 508.

Aluminum plates 508 and cast iron plates 510 may have any suitable length that allows for expansion and contraction of the dissimilar metals and to allow for compensation of the movement of substrate 502. The present invention also contemplates linear motor reaction plate 506 being formed from a single piece of material that is compatible with propulsion system 408. One reason for aluminum plates 508 sandwiched within cast iron plates 510 is to attain maximum advantage of the known art eddy current and magnetic flux complement when exposed to a magnetic field in motion as provided by propulsion system 408 of the present invention.

FIG. 5B illustrates a track 550 that resembles a more conventional track system used in conventional railroads. Track 550 includes a substrate 552 and a pair of rails 554. Substrate 552 may be similar to substrate 502 of FIG. 5A or may be a plurality of conventional cross ties. Rails 554 include conventional rails found in conventional railroad systems and are formed from any suitable material, such as steel. In the embodiment illustrated in FIG. 5B, rails 554 serve as both the guideway and a load supporting structure for transport vehicle 400. In this manner, wheels 407 include flanges 555 similar to those found on conventional railroad wheels.

In the embodiment illustrated in FIG. 5B, a horizontal orientation for linear induction motors of propulsion 408 may be an option. In this embodiment, the linear motor reaction plates would be positioned in a flat position on substrate 552 between rails 554 (not illustrated) and interact with horizontally oriented linear induction motors coupled to the underside of transport vehicle 400. This configuration would obviate the need to provide a vertical slot or space in the lower, center portion of transport vehicle 400 to straddle a vertical center plate motor component, such as linear motor reaction plate 506.

Figure 6:
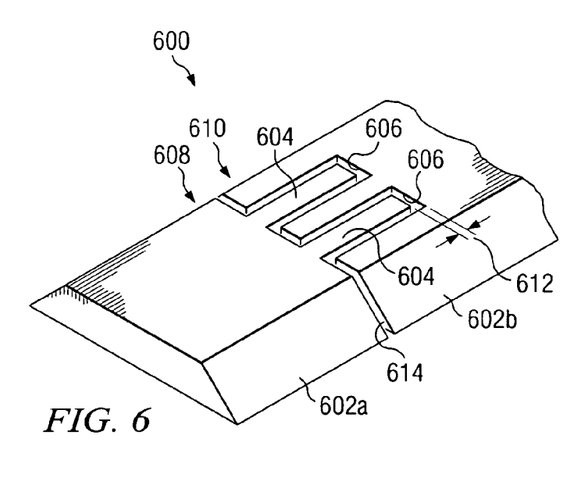
FIG. 6 is a partial perspective view illustrating a design for a flat rail according to one embodiment of the invention.

FIG. 6 is a partial perspective view illustrating a design for a flat rail 600 according to one embodiment of the invention. Rail 600 is particularly suitable for the embodiment of track 500 illustrated in FIG. 5A. In order to account for thermal expansion and contraction, rail 600 includes a plurality of flat rail sections 602a, 602b that are coupled to, embedded within, and/or attached to, a suitable substrate (not illustrated). Rail section 602a, 602b are arranged in an end-to-end manner and each rail section 602a, 602b has one or more protrusions 604 coupled at a first end 608 and one or more recesses 606 formed in a second end 610. The protrusions 604 are disposed within respective recesses 606 of an adjacent rail section in such a manner that a spacing 612 exists between the free end of protrusions 604 in a bottom of the recesses 606 to allow the rail sections 602a, 602b to expand and/or contract as the temperature of rail section 602a, 603b change, thereby maintaining a smooth and continuous surface for rail 600. In a particular embodiment, spacing 612 is approximately one-quarter (¼) inches.

In one embodiment, the ends of rail sections may be tapered at any suitable angle, as indicated by reference numeral 614. Other suitable arrangements for coupling rail section 602a, 602b are contemplated by the present invention. One advantage of the design illustrated in FIG. 6 is the substantial reduction or elimination of derailments caused by longitudinal stresses that develop in conventional rails.

Figure 7:
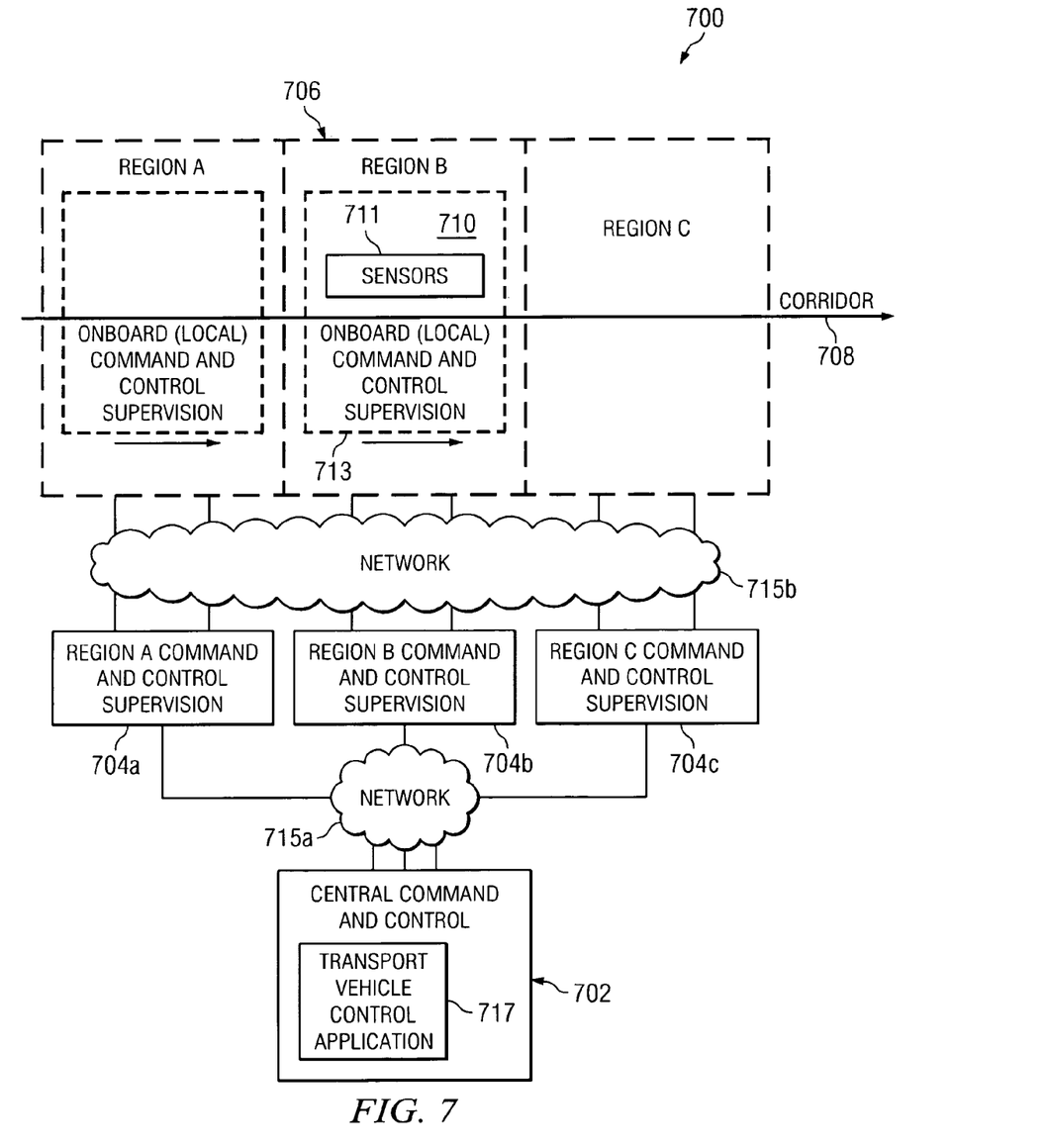
FIG. 7 is a schematic illustrating a command, control, and communications design for a freight transportation system according to one embodiment of the invention.

FIG. 7 is a schematic illustrating a command, control and communications system 700 for a freight transportation system according to one embodiment of the invention. In the illustrated embodiment, system 700 includes a central control system 702 coupled to a plurality of regional control systems 704 that function to control particular regions 706 along a particular route 708. In this "hierarchical" control system, Region A control system 704a would transfer the control of a transport vehicle 710 to Region B control system 704b, much like a cell phone network transferring a call from one cell to the next. In other embodiments, central control system 702 directly controls each region 706 of route 708.

Control system 700 functions to manage and control various parameters of transport vehicle 710, such as speed, location, relative location, and other suitable parameters. In addition, control system 700 may perform health monitoring for transport vehicles 710 in order to anticipate any mechanical problems with transport vehicles and to reduce down-time. This health monitoring may be facilitated by having one or more sensors 711 coupled to transport vehicles 400 in suitable locations. These sensors 711 may be coupled to an on-board control system 713 associated with a particular transport vehicle 400. On-board control system 713 may be housed within an aerodynamic covering 410 (FIGS. 4A and 4B) or other suitable location. Any suitable wireline or wireless communications networks, as designated by reference numerals 715a and 715b, may be utilized for communication between central control system 702, regional control systems 704, and on-board control systems 713.

Central control system 702, which may be based in any suitable location, may function to monitor the entry and exit events of transport vehicles 400 at truck terminals 300, maintain supervisory authority over regional control systems 704, and conduct traffic flow predictions for performance characterizations within a freight transportation system to compare actual performance updates against a performance plan. Other suitable functions are also contemplated by the present invention.

As illustrated in FIG. 7, central control system 702 includes a transport vehicle control application 717 stored on any suitable computer or computing system. Transport vehicle control application 717 is a computer program or set of computer programs that may be written in any suitable computer language. According to the teachings of one embodiment of the invention, transport vehicle control application 802 automatically controls the movement of transport vehicles associated with freight transportation systems of the present invention. Transport vehicle control application 717 may also work in conjunction with other applications to manage the transportation of cargo using transport vehicles. An example function of transport vehicle control application 717 is described below in conjunction with FIG. 8.

Regional control systems 704, in one embodiment, function to monitor control for over- or under-utilization of control elements within its sphere of authority. For example, regional control systems 704 may monitor localized overheating of the power distribution system that a particular transport vehicle is drawing power from, which could be indicative of a motor failure or substantially increased wheel/axle friction, or other suitable conditions of the transport vehicle. Regional control systems 704 may also maintain the correct transport vehicle count, speed, and local power conditions. Other suitable functions are also contemplated by the present invention.

On-board control systems 713, in one embodiment, include on-board computing systems and power control systems monitoring vehicular sensors, such as sensors 711, to establish speed, distance to the immediate transport vehicle in front of it, and other suitable parameters. On-board control system 713 provides feedback to either its respective regional control system 704 or to central control system 702 directly.

Figure 8:
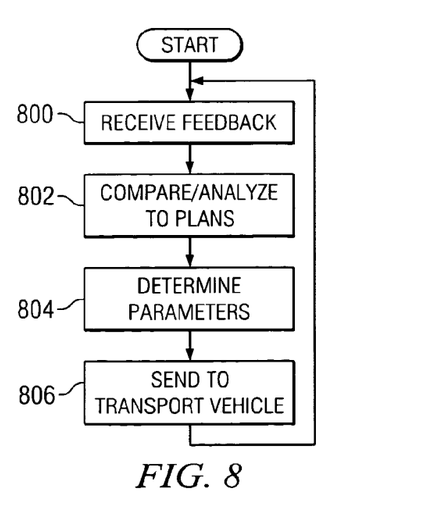
FIG. 8 is a flowchart illustrating an example method of controlling a freight transportation system according to one embodiment of the invention.

FIG. 8 is a flowchart illustrating an example method of controlling a transport vehicle according to one embodiment of the invention. The example method begins at step 800 where feedback is received from a particular transport vehicle. This feedback may include such things as the speed, location, or condition of a particular transport vehicle. At step 802, this information is analyzed and compared to particular performance plans or transport plans in order to control the transport vehicle. At step 804, various parameters for the transport vehicle are determined in order to efficiently manage the movement of transport vehicle and these parameters are sent, at step 806, to the transport vehicle. This continuous loop feedback of information continues until the particular transport vehicles has completed its performance plan.

Thus, in one embodiment, a freight transportation system as described herein provides an economical alternative to intermediate distance, inter-city trucking that embodies characteristics that provide for the avoidance of the social costs associated with both inter-city and intra-city trucking. Such a freight transportation system may operate in a separated and secure alignment that provides for greatly improved levels of freight security that ensures that sealed containers, for example, are not tampered with in transit. In some embodiments, the provision for urban dray vehicles to pick up and deliver freight in urban areas rather than heavy over-the-road diesel rigs to process of the impact urban air quality. It may also take an important step away from a transportation infrastructure design married to petroleum-based systems. The use of electrical power for propulsion may allow the freight transportation system to operate with electricity generated from a wide array of sources.

Although the present invention is described by several embodiments, various changes and modifications may be suggested to one skilled in the art. The present invention intends to encompass such changes and modifications as they fall within the scope of the present appended claims.

What is claimed is:

1. A freight transportation system, comprising:
   a track comprising a pair of rails and a linear motor reaction plate disposed between the rails;
   a transport vehicle having a universal intermodal container bay configured to accommodate a plurality of containers, the transport vehicle comprising one or more suspension systems each having a plurality of steel wheels engaged with the rails;
   a linear induction propulsion system coupled to the transport vehicle and operable to work in conjunction with the linear motor reaction plate to move the transport vehicle; and
   a control system coupled to the linear induction propulsion system and operable to control the movement of the transport vehicle.

2. The system of claim 1, wherein lengths of the containers range from approximately forty to approximately fifty-four feet.

3. The system of claim 1, wherein the transport vehicle further comprises aerodynamically-shaped coverings at each of a leading end and a trailing end.

4. The system of claim 1, wherein the linear motor reaction plate is vertical, and wherein the linear induction propulsion system comprises a plurality of pairs of opposed linear induction motors disposed on either side of the linear motor reaction plate.

5. The system of claim 4, wherein a spacing of at least one-half inches exists between each of the linear induction motors and the linear motor reaction plate.

6. The system of claim 4, wherein the linear motor reaction plate comprises a plurality of inner aluminum plates and a plurality of outer cast iron plates.

7. The system of claim 1, wherein the steel wheels and the rails have flat surfaces.

8. The system of claim 7, wherein the steel wheels are operable to turn independently of each other.

9. The system of claim 1, wherein the linear motor reaction plate is horizontal, and wherein the linear induction propulsion system comprises a plurality of horizontal linear induction motors coupled to an underside of the transport vehicle.

10. The system of claim 9, wherein the steel wheels have flanges associated therewith.

11. The system of claim 1, wherein the control system is further operable to control speed, acceleration, and deceleration of the transport vehicle.

12. The system of claim 8, wherein the control system is further coupled to a regenerative braking system that produces power that feeds back into the control system.

13. A track for a freight transportation system, comprising:
   a substrate;
   a pair of rails coupled to the substrate; and
   a linear motor reaction plate vertically disposed between the rails and approximately equidistant from each rail, the linear motor reaction plate comprising a plurality of plates, each of the plurality of plates positioned such that an edge of each of the plurality of plates is disposed on the substrate, the linear motor reaction plate operable to work in conjunction with a linear induction propulsion system to move a transport vehicle upon the pair of rails.

14. The track of claim 13, wherein the substrate is formed from reinforced concrete.

15. The track of claim 13, wherein the rails are partially embedded within the substrate.

16. The track of claim 13, wherein the rails include flat running surfaces configured to engage one or more flat wheels of a transport vehicle.

17. The track of claim 13, wherein each rail includes tapered sides extending from the flat running surface to the substrate.

18. The track of claim 13, wherein a height of the linear motor reaction plate is at least eighteen inches.

19. The track of claim 13, wherein the linear motor reaction plate is formed from cast iron.

20. The track of claim 13, wherein the linear motor reaction plate comprises a plurality of inner aluminum plates and a plurality of outer cast iron plates.

21. A rail system for a freight transportation system, comprising:
   a concrete substrate;
   a plurality of flat rail sections coupled to the concrete substrate and arranged in an end-to-end manner;
   wherein the junction of adjacent rail sections comprise at least one protrusion coupled to a first end of one of the rail sections and at least one recess formed in a second end of the other rail section; and
   wherein the protrusion is disposed within the recess in such a manner that a spacing exists between a free end of the protrusion and a bottom of the recess to allow the rail sections to expand and contract as the temperature of the rail sections change.

22. The rail system of claim 21, wherein the rail sections are embedded within the concrete substrate.

23. The rail system of claim 21, wherein the first and second ends of the rail sections are tapered.

24. The rail system of claim 21, wherein the spacing is approximately one-quarter inches.

25. The system of claim 1, wherein the linear motor reaction plate is vertically disposed between the pair of rails and approximately equidistant from each rail, and wherein the linear motor reaction plate comprises a plurality of plates positioned such that an edge of each of the plurality of plates is disposed on the substrate.

* * * * *